United States Patent
Berner et al.

(10) Patent No.: US 10,713,144 B2
(45) Date of Patent: Jul. 14, 2020

(54) VIRTUAL PROCESSOR ENABLING REAL-TIME IN SITU DISASSEMBLY AND DEBUGGING IN SOC ENVIRONMENT

(71) Applicant: General Electric Company, Schenectady, NY (US)

(72) Inventors: Andrew William Berner, Waterford, NY (US); Tab Mong, Erie, PA (US); Richard Gawrelski, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 15/813,393

(22) Filed: Nov. 15, 2017

(65) Prior Publication Data
US 2019/0146896 A1 May 16, 2019

(51) Int. Cl.
*G06F 9/45* (2006.01)
*G06F 11/36* (2006.01)
*G06F 30/331* (2020.01)
*G06F 15/78* (2006.01)

(52) U.S. Cl.
CPC ............ *G06F 11/36* (2013.01); *G06F 30/331* (2020.01); *G06F 15/7821* (2013.01)

(58) Field of Classification Search
CPC .. G06F 17/5027; G06F 11/36; G06F 15/7821; G06F 30/33
USPC ........................................................ 717/134
See application file for complete search history.

(56) References Cited

U.S. PATENT DOCUMENTS

| | | | |
|---|---|---|---|
| 5,963,212 A | 10/1999 | Bakalash et al. | |
| 6,938,177 B1 | 8/2005 | Blemel et al. | |
| 6,970,988 B1 | 11/2005 | Chung et al. | |
| 7,546,438 B2 | 6/2009 | Chung et al. | |
| 7,720,662 B1* | 5/2010 | Aldrich | G06F 11/3692 345/589 |
| 7,765,095 B1* | 7/2010 | Nemecek | G06F 11/3656 703/26 |
| 7,990,994 B1* | 8/2011 | Yeh | H04L 12/4641 370/431 |
| 8,265,917 B1* | 9/2012 | Ou | G06F 30/34 703/14 |

(Continued)

OTHER PUBLICATIONS

Title: Design-for-debug for post-silicon validation: Can high-level descriptions help, author: N. Nicolici, published on 2009.*

(Continued)

*Primary Examiner* — Chameli Das
(74) *Attorney, Agent, or Firm* — Buckley, Maschoff & Talwalkar LLC

(57) ABSTRACT

The example embodiments are directed to a system and method for a virtual processor that enables real-time in situ disassembly and debugging. In one example, the method includes implementing a virtual processor in field programmable gate array (FPGA) programmable logic, the virtual processor comprising a virtual version of a target system, capturing data representative of operations in the virtual processor using a bus access device configured to provide direct access to components of the virtual processor, streaming the data to the embedded processor, storing the data in the memory device, and performing in-situ disassembly and debugging.

17 Claims, 4 Drawing Sheets

(56) References Cited

U.S. PATENT DOCUMENTS

| | | | | |
|---|---|---|---|---|
| 2006/0015674 | A1* | 1/2006 | Murotake | G06F 9/4401 |
| | | | | 711/101 |
| 2011/0240621 | A1* | 10/2011 | Kessler | G01N 25/72 |
| | | | | 219/200 |
| 2013/0117766 | A1* | 5/2013 | Bax | G06F 9/4405 |
| | | | | 719/323 |
| 2013/0151646 | A1* | 6/2013 | Chidambaram | H04L 47/6205 |
| | | | | 709/213 |
| 2013/0325873 | A1 | 12/2013 | Sitsky et al. | |
| 2015/0082305 | A1* | 3/2015 | Hepkin | G06F 21/53 |
| | | | | 718/1 |
| 2015/0324224 | A1* | 11/2015 | Hall | G06F 9/4881 |
| | | | | 718/108 |
| 2015/0355933 | A1* | 12/2015 | Xie | G06F 9/455 |
| | | | | 718/1 |
| 2016/0205115 | A1* | 7/2016 | Kulkarni | G06F 21/568 |
| | | | | 726/1 |
| 2016/0306862 | A1 | 10/2016 | Sitsky et al. | |
| 2016/0357988 | A1* | 12/2016 | Ferguson | H04L 9/0894 |
| 2017/0139064 | A1 | 5/2017 | Song et al. | |
| 2017/0176523 | A1* | 6/2017 | Menon | G01R 31/31705 |
| 2018/0165175 | A1* | 6/2018 | Guan | G06F 11/3664 |

OTHER PUBLICATIONS

Kwan-Liu, Ma et al., "In-Situ Processing and Visualization for Ultrascale Simulations", Journal of Physics: Conference Series, vol. 78, 2007, DOI: 10.1088/1742-6596/78/1/012043, 10pgs.

Kim, Jinoh et al., "Parallel In Situ Indexing for Data-Intensive Computing", IEEE Symposium on Large Data Analysis and Visualization (LDAV), (http://ieeexplore.ieee.org/abstract/document/6092319/, Dec. 1, 2011, (pp. 65-72, 8 total pages).

Viswanathan, Hariharasudhan et al., "A Multi-Objective Approach to Real-Time In-Situ Processing of Mobile-Application Workflows", IEEE Transactions on Parallel and Distributed Systems, http://ieeexplore.ieee.org/document/7422143/, vol. 27, Issue 11, Nov. 1, 2016, DOI: 10.1109/TPDS.2016.2532864, (pp. 3116-3130, 15 total pages).

* cited by examiner

US 10,713,144 B2

VIRTUAL PROCESSOR ENABLING REAL-TIME IN SITU DISASSEMBLY AND DEBUGGING IN SOC ENVIRONMENT

BACKGROUND

Machine and equipment assets are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include devices that aid in diagnosing patients such as imaging devices (e.g., X-ray or MRI systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies, have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

As technology develops, it may be desirable or necessary to emulate one or more hardware devices in software. One such situation arises when hardware and/or software becomes outdated (referred to as legacy hardware or code), but the older hardware is needed to perform software debug and development. Typically, a conventional hardware emulator or debugger must be plugged into a target system via an external pod (e.g., external hardware) that connects to numerous device pins in order to interface with the target system. This is cumbersome and time consuming. In most cases, it is also unlikely that a debugger can be installed to a product installed on an asset.

SUMMARY

Embodiments described herein improve upon the prior art by providing systems and methods which enable in situ disassembly and debugging. Rather than using an additional external component, the inventors have developed an in situ disassembler/debugger which leverages existing hardware and capabilities within a product (e.g., legacy system).

"In Situ" means in place, translating literally to "on site" or "in position." In computer science, an in situ operation is one that occurs without interrupting the normal state of a system. For example, debug operation may be performed over a running system, without needing to take the system down to perform the debug. Thus, as used herein, the term "in situ" includes reference to software debug and development capabilities that exist in the actual product/design. To facilitate backward compatibility (e.g., allowing for interoperability with an older legacy system, or with input designed for such as system), older generations of hardware are emulated using software.

Among other advantages, the resulting system may be accessed and turned on at any time (e.g., via Ethernet or other type of communications medium) to perform on-the-fly (real-time) debugging and disassembly. The need for external hardware or intrusive software is eliminated. User visibility into a data processor's actual operation may be optimized. Meanwhile, the virtual environment is invisible to the environment within the legacy system (running on the same computer).

In some examples, the embodiments herein may be incorporated within software that is deployed on a cloud platform for use with an Industrial Internet of Things (IIoT) system.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
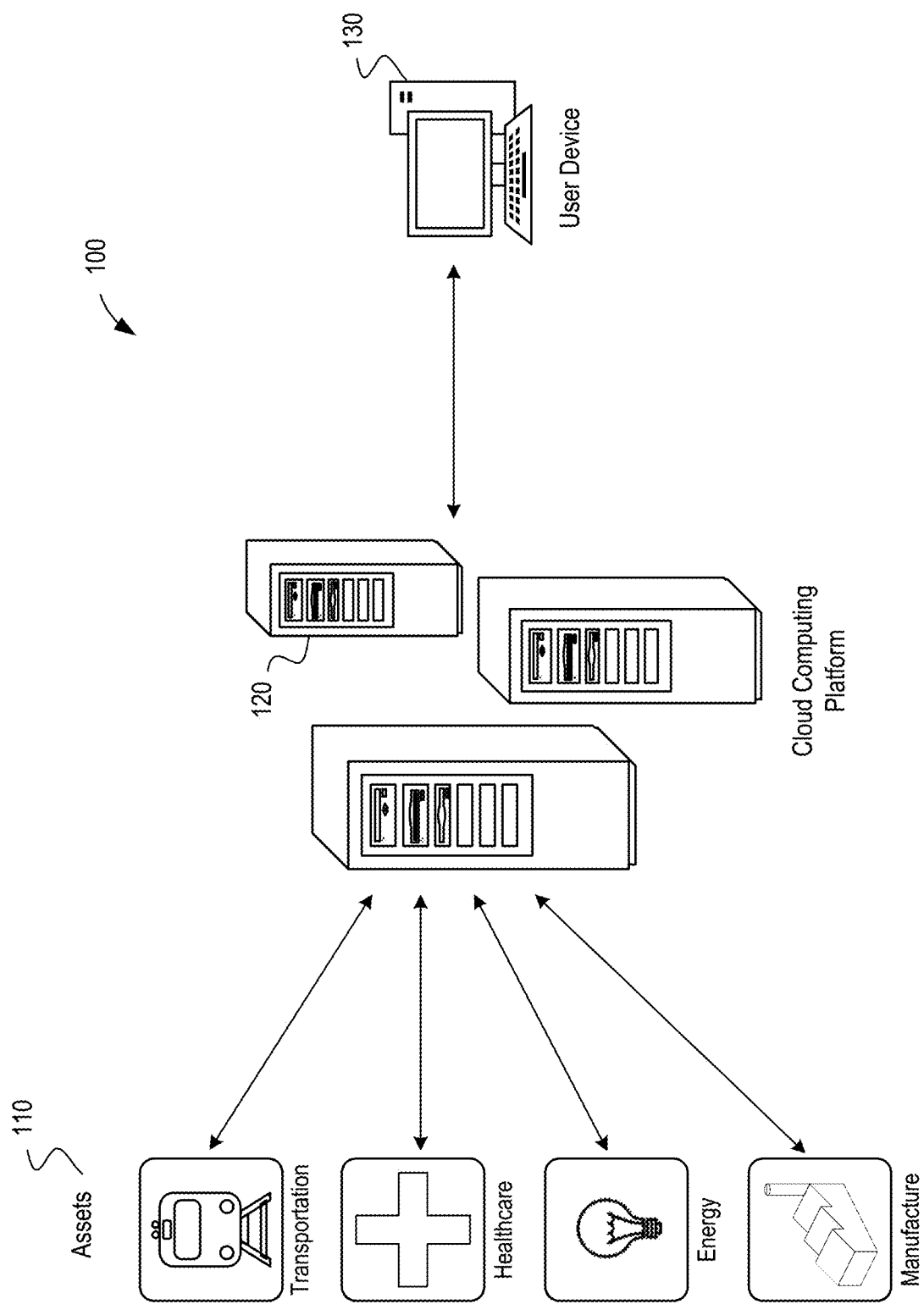
FIG. 1 is a diagram illustrating a cloud computing environment in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments relate to a virtual processor enabling real-time in situ disassembly and debugging in a system-on-chip (SoC) environment.

The concept of a virtual processor, or soft processor, is known, but prior systems did not provide for an in situ disassembler or debugger. Using a virtual version of an existing processor control (e.g., processors, memories, controllers, etc.), with field programmable gate array (FPGA) or application-specific integrated circuits (ASIC) logic, the example embodiments add data paths and signals that enable the parallel processing system to capture and record any and all contents of any memory location in any memory device, any software instructions, and any exceptions (e.g., interrupts and errors). The parallel processing system processes the captured information through a software disassembly program to create a disassembled version of the executed software in situ.

The technical effect is provided by the in situ disassembly program which provides the ability to perform modern software debug operations on a processor target (e.g., allowing the addition of trace points, break points, and trace capture) without external support hardware or software, and without changing the original code in doing so.

FIG. 1 illustrates a cloud computing system 100 for industrial software and hardware in accordance with an example embodiment. Referring to FIG. 1, the system 100 includes a plurality of assets 110 which may be included within an Industrial Internet of Things (IIoT) and which may transmit raw data to a source such as cloud computing platform 120 where it may be stored and processed. It should also be appreciated that the cloud platform 120 in FIG. 1 may be replaced with or supplemented by a non-cloud platform such as a server, an on-premises computing system, and the like. Assets 110 may include hardware/structural assets such as machine and equipment used in industry, healthcare, manufacturing, energy, transportation, and that like. It should also be appreciated that assets 110 may include software, processes, resources, and the like.

The data transmitted by the assets 110 and received by the cloud platform 120 may include data that is being input to hardware and/or software deployed on or in association with the assets 110, raw time-series data output as a result of the operation of the assets 110, and the like. Data that is stored and processed by the cloud platform 120 may be output in some meaningful way to user devices 130. In the example of FIG. 1, the assets 110, cloud platform 120, and user devices 130 may be connected to each other via a network such a public network (e.g., Internet), a private network, a wired network, a wireless network, etc. User devices 130 may interact with software hosted by and deployed on the cloud platform 120 in order to receive data from and control operation of the assets 110.

It should be appreciated that the system 100 is merely an example and may include additional devices and/or one of the devices shown may be omitted.

According to various aspects, software applications that can be used to enhance or otherwise modify the operating performance of an asset 110 may be hosted by the cloud platform 120 and may operate on the asset 110. For example, software applications may be used to optimize a performance of the assets 110 or data coming in from the asset 110. As another example, the software applications may analyze, control, manage, or otherwise interact with the asset 110 and components (software and hardware) thereof. A user device 130 may receive views of data or other information about the asset 110 as the data is processed via one or more applications hosted by the cloud platform 120. For example, the user device 130 may receive graph-based results, diagrams, charts, warnings, measurements, power levels, and the like.

In this example, an asset management platform (AMP) can reside within or be connected to the cloud platform 120, in a local or sandboxed environment, or can be distributed across multiple locations or devices and can be used to interact with the assets 110. The AMP can be configured to perform functions such as data acquisition, data analysis, data exchange, and the like, with local or remote assets 110, or with other task-specific processing devices. For example, the assets 110 may be an asset community (e.g., turbines, healthcare, power, industrial, manufacturing, mining, oil and gas, elevator, etc.) which may be communicatively coupled to the cloud platform 120 via one or more intermediate devices such as a stream data transfer platform, database, or the like.

Information from the assets 110 may be communicated to the cloud platform 120. For example, external sensors can be used to sense information about a function of an asset, or to sense information about an environment condition at or around an asset, a worker, a downtime, a machine or equipment maintenance, and the like. The external sensor can be configured for data communication with the cloud platform 120 which can be configured to store the raw sensor information and transfer the raw sensor information to the user devices 130 where it can be accessed by users, applications, systems, and the like, for further processing. Furthermore, an operation of the assets 110 may be enhanced or otherwise controlled by a user inputting commands though an application hosted by the cloud platform 120 or other remote host platform such as a web server. The data provided from the assets 110 may include time-series data or other types of data associated with the operations being performed by the assets 110.

In some embodiments, the cloud platform 120 may include a local, system, enterprise, or global computing infrastructure that can be optimized for industrial data workloads, secure data communication, and compliance with regulatory requirements. The cloud platform 120 may include a database management system (DBMS) for creating, monitoring, and controlling access to data in a database coupled to or included within the cloud platform 120. The cloud platform 120 can also include services that developers can use to build or test industrial or manufacturing-based applications and services to implement IIoT applications that interact with assets 110.

For example, the cloud platform 120 may host an industrial application marketplace where developers can publish their distinctly developed applications and/or retrieve applications from third parties. In addition, the cloud platform 120 can host a development framework for communicating with various available services or modules. The development framework can offer developers a consistent contextual user experience in web or mobile applications. Developers can add and make accessible their applications (services, data, analytics, etc.) via the cloud platform 120. Also, analytic software may analyze data from or about a manufacturing process and provide insight, predictions, and early warning fault detection.

Figure 2:
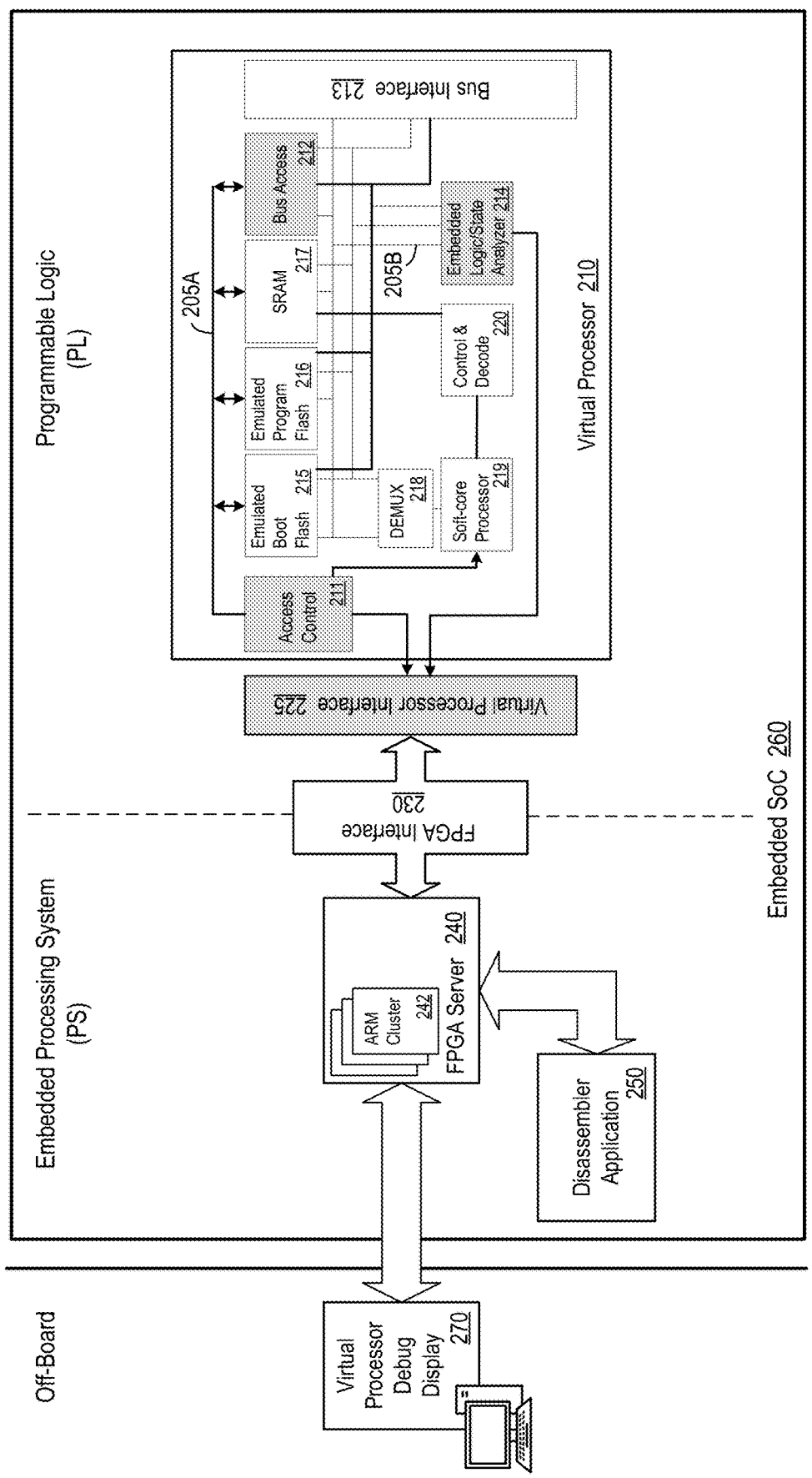
FIG. 2 is a block diagram illustrating a system-on-chip (SoC) design in accordance with an example embodiment.
Figure 3:
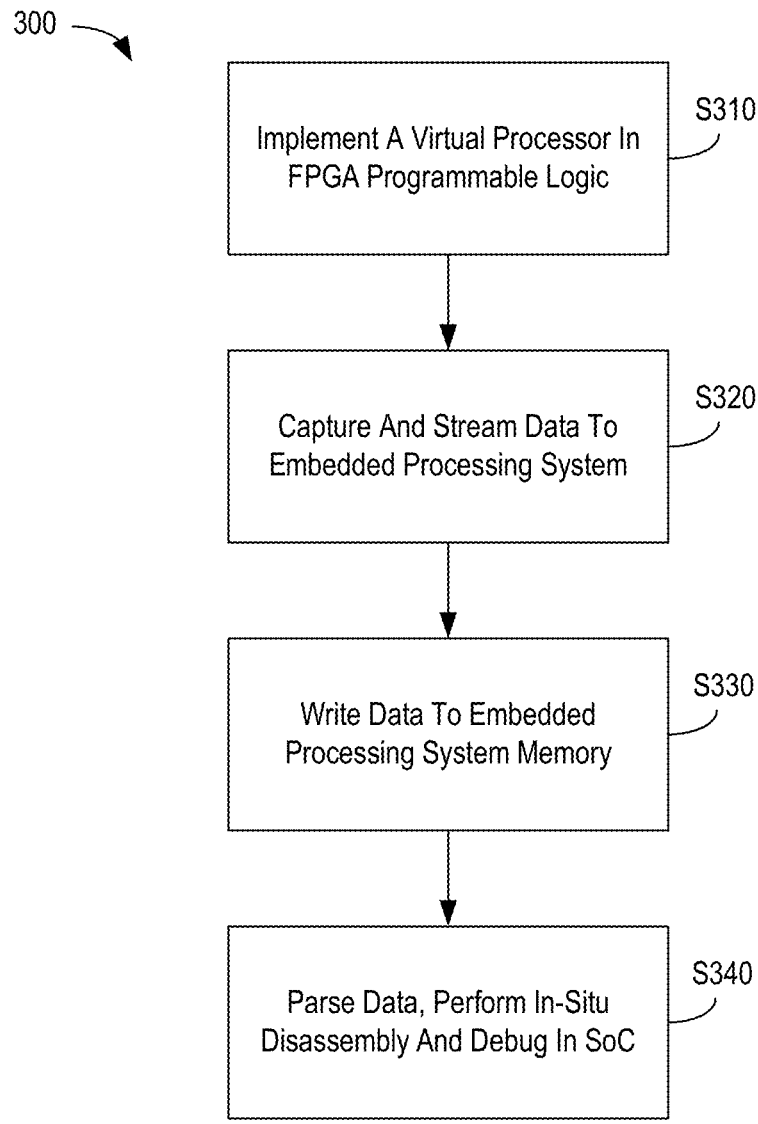
FIG. 3 is a flow chart illustrating a process that may be performed according to aspects of the present disclosure in the system of FIG. 2.

Reference is now made to FIGS. 2 and 3, which will be discussed together. FIG. 2 illustrates of a system-on-chip (SoC) design 260, which may be a field programmable SoC, in accordance with an example embodiment. In some embodiments, the system 260 may also be implemented in other integrated circuit technologies such as in application-specific integrated circuits (ASICs). FIG. 3 illustrates a process 300 that may be performed according to aspects of the present disclosure in the system of FIG. 2.

As shown in FIG. 2, embedded SoC 260 may comprise a processing system ("PS") side and a programmable logic ("PL") side. The PS side comprises the processor portion (in this example an ARM-based processor portion), which includes ARM-based processor(s) hosting a (FPGA) server 240 and a disassembler application 250 coupled to FPGA logic (e.g., FPGA hardware definition language (HDL)). The PL side comprises the FPGA portion, which includes a virtual processor 210 (e.g., virtual machine/computer) coupled to virtual processor interface 225. An FPGA interface device 230 is coupled between the PS side and the PL side. In some embodiments, FPGA interface 230 may be an Advanced eXtensible Interface (AXI) Interconnect device. The PS side and the PL side form a single SoC component 260 or equivalent.

On the PS side, the processor cores 242 (e.g., an ARM cluster) may implement a FPGA server 240. For example, the ARM cores may be a quad-core ARM Cortex-A53 processor, or another type of processor. In some embodiments, the ARM cores perform disassembly operations. Disassembler application 250 allows the addition of trace points, break points, and trace capture without external hardware or software (e.g., hardware or software not forming a portion of the device). Disassembler application 250 converts machine language (e.g., operation code (opcode)) associated with virtual processor 210) into assembly language or a human-readable format (e.g., disassembled code or a low-level programming language).

On the PL side, virtual processor 210 is a FPGA HDL and software logical implementation of a computer system. In virtual processor 210, hardware components of a computer are emulated (e.g., virtualized) in register transfer logic (RTL) in ASIC or FPGA fabric. The operation of the hardware device is emulated in the logical representation of the targeted legacy processor (in this case the Intel® 80186 microprocessor 219).

As shown in FIG. 3, a process 300 that may be performed according to aspects of the present disclosure beings at S310, where a virtual processor that is capable of in situ disassembly and debugging routines is implemented in FPGA programmable logic.

Virtual processor 210 comprises existing functionalities that are part of an older generation of hardware (e.g., legacy hardware/system), including soft-core processor 219 (e.g., Intel® 80186), virtual system memory including boot flash memory 215, program flash memory 216, static random-access memory (SRAM) 217, data demultiplexer (DEMUX) 218, control and decode logic 220, and bus interface device 213, all of which are implemented in software to emulate the corresponding components of an actual computer.

Virtual processor 210 according to an embodiment advantageously also comprises, or is connected to, conduit features (e.g., shaded components in FIG. 2) not originally part of the legacy system that allow users to tap into the emulated system (e.g., legacy system) described above. The conduit features include virtual processor interface 224, access controller 211, bus access device 212, and an embedded logic/state analyzer 214 (such as Xilinx's® ChipScope™).

Access controller 211 is a customized debug access function that allows a user to access any memory location of virtual processor 210, for example, boot flash memory 215, program flash memory 216, SRAM 217, directly from an ARM processor on the PS side without affecting aspects of virtual processor 210. For example, a user can access virtual system memories 215, 216, 217 directly, without going through soft-core processor 219 or other functional units of virtual processor 210, to read and write data. In some embodiments, internal registers of soft-core processor 219 may be accessed directly as well.

Bus access device 212 provides direct access to the rest of the virtual processing system 210. Bus access device 212 provides an ARM system on the PS side to directly access buses on the PL side without adversely affecting the processor 219. For example, users may "peek and poke" into memory or registers of system 210 via a set of buses 205A (illustrated by bolded lines) at any time (e.g., as it is running) without adversely affecting the operation of the system 210. Advantageously, bus lines 205A allow a user to tap into memories 215, 216, 217 and into the soft-core processor 219, and pull data from those memories or registers as it is running via a set of buses 205B (illustrated by the unbolded lines). These integrated capabilities were not previously possible using the older hardware. Data may be written into bus access device 212 without halting or interfering with processor 219.

In some embodiments, an integrated logic analyzer 214 may be used to sample data from the running on-chip design. The logic analyzer allows probing of internal signals of a design inside an FPGA (e.g., FPGA nets/wires). For example, the logic analyzer may be used to retrieve output data from DEMUX 218, processor 219, control and decode 220, etc., analyze the data, and stream the data to the PS side via virtual processor interface 225 and FPGA interface 230. In some embodiments, signals are captured in the system at the speed of operation and brought out through the programming interface. Captured signals may be displayed and analyzed using an analyzer tool 214.

In some embodiments, a direct memory access (DMA) engine in ARM cluster 242 is used to control the direct transfer of data between different memories from a data source and data destination via a DMA channel. The DMA engine may include, in part, a DMA controller, an associated memory buffer, and one or more first-in-first out (FIFO) buffers accepting data transfer requests from the PL side. DMA control logic on the PL side is controlled by software on the PS side.

At S320, the DMA engine may be configured to capture and stream data from selected communication ports and virtual memories from the PL side over to memory on the PS side using bus access device 212 via DMA channel. Virtual processor 210 may be implemented as entirely software and timing compatible with existing software. In some embodiments, data may be sampled at a sampling rate of the virtual processor CPU 219. This software-based emulation system 210 provides for complete observability and controllability of all nodes within the system (e.g., data, software operations, system states, etc.).

Next at S330, data is written to (e.g., stored in) the embedded processing system memory via DMA transfer to memory (e.g., double data rate fourth-generation synchronous dynamic random-access (DDR4) memory). When the DMA transfer is complete, the DMA engine may inform (e.g., interrupt) the server 240 such that the server 240 can begin parsing the data at S340. Data from these nodes are used in situ by the parallel processing system to run disassembly application 250 on the code, at S340, to provide modern software capabilities such as tracing/recording a series of processor operations, setting breakpoints and watchpoints, halting execution upon a specified set of conditions, examining/modifying data values, performing event counting, and the like.

In some cases, it is beneficial to capture data only when certain conditions are met. By way of example, the PL side can capture data when signals connected to a trigger port have certain values that are detected. When the trigger condition is set, the server 240 will wait for the trigger condition before capturing the data. When the capture process is triggered and is completed, data may be pushed into a certain location in the processing system memory (e.g., PS RAM, not separately shown). A triggering operation starts one or more debug operations such as a tracing operation. The data may be spooled into disassembler application 250, via which the user may perform debug and disassembly routines including breakpoints/watchpoints, tracing, operation halting, etc.

In some embodiments, an off-board computer 270, coupled to FPGA server 240, may be used to display a debugging output.

Figure 4:
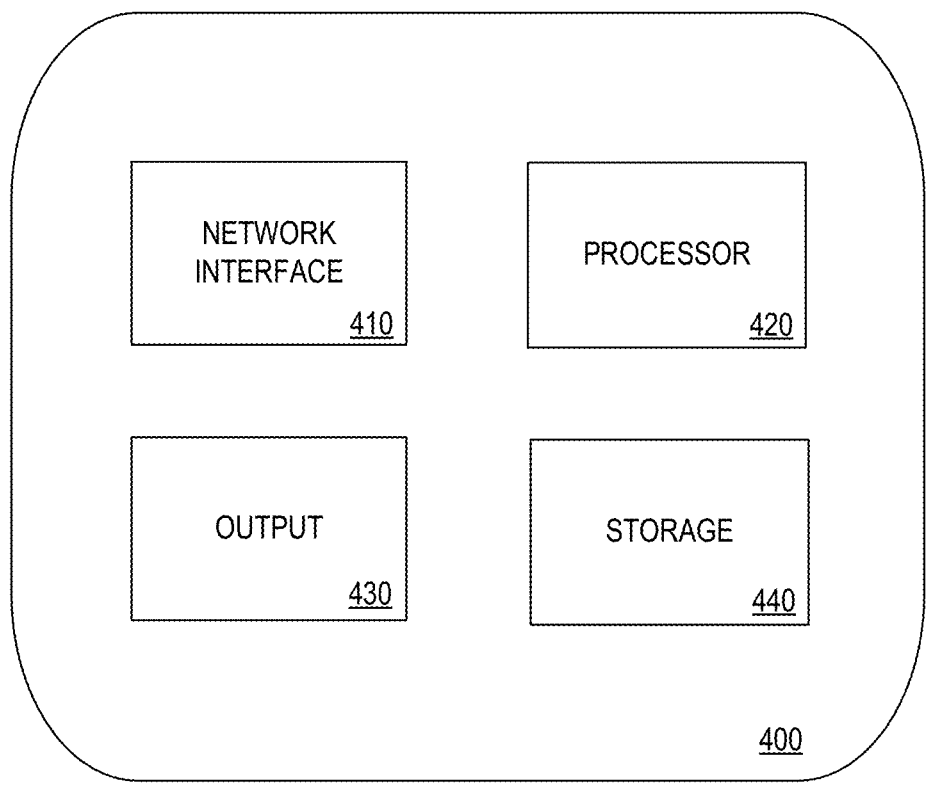
FIG. 4 is a block diagram illustrating a computing system for in situ disassembly and debugging in accordance with an example embodiment.

FIG. 4 illustrates a computing system 400 for in situ disassembly and debugging in accordance with an example embodiment. For example, the computing system 400 may be a database, cloud platform, streaming platform, user device, and the like. As a non-limiting example, the computing system 400 may be the cloud platform 120 shown in FIG. 1. In some embodiments, the computing system 400 may be distributed across multiple devices. Also, the computing system 400 may perform the method of FIG. 3. Referring to FIG. 4, the computing system 400 includes a network interface 410, a processor 420, an output 430, and a storage device 440 such as a memory. Although not shown in FIG. 4, the computing system 400 may include other components such as a display, an input unit, a receiver, a transmitter, an application programming interface (API), and the like, all of which may be controlled or replaced by the processor 420.

The network interface 410 may transmit and receive data over a network such as the Internet, a private network, a public network, and the like. The network interface 410 may be a wireless interface, a wired interface, or a combination thereof. The processor 420 may include one or more processing devices each including one or more processing cores. In some examples, the processor 420 is a multicore processor or a plurality of multicore processors. Also, the processor 420 may be fixed or it may be reconfigurable. The output 430 may output data to an embedded display of the computing system 400, an externally connected display, a display connected to the cloud, another device, and the like. The storage device 440 is not limited to a particular storage device and may include any known memory device such as RAM, ROM, hard disk, and the like, and may or may not be included within the cloud environment. The storage 440 may store software modules or other instructions which can be executed by the processor 420 to perform the methods described herein. Also, the storage 440 may store software programs and applications which can be downloaded and installed by a user. Furthermore, the storage 440 may store and the processor 420 may execute an application marketplace that makes the software programs and applications available to users that connect to the computing system 400.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a virtual processor implemented in field programmable gate array (FPGA) programmable logic, the virtual processor comprising a virtual version of a target system;
a memory device storing instructions; and
an embedded processor coupled to the FPGA programmable logic via a virtual processor interface, the embedded processor being distinct from the FPGA programmable logic and configured to execute the instructions, wherein the executed instructions cause the embedded processor to:
capture data representative of operations in the virtual processor using a bus access device configured to provide direct access to components of the virtual processor;
stream the data to the embedded processor via the virtual processor interface;
store the data in the memory device; and
perform, substantially in real time while the target system is running, in-situ disassembly and debugging of the data representative of the operations of the virtual processor, wherein the debugging comprises one or more of a tracing operation, a breakpoint operation, a watchpoint operation, a triggering operation, a halting operation, or an event counting operation.

2. The computing system of claim 1, wherein the memory device is a random-access memory (RAM)-based first-in-first-out (FIFO) memory.

3. The computing system of claim 1, wherein the data is streamed to the embedded processor using a using a direct memory access (DMA) channel.

4. The computing system of claim 1, wherein the virtual processor implemented in FPGA logic is instead implemented in Application Specific Integrated Circuit (ASIC) logic.

5. The computing system of claim 1, wherein the memory device is double data rate (DDR) memory and the data stored in the memory device is written into the memory device via a DMA transfer.

6. The computing system of claim 1, wherein the hardware and operations of the target system are emulated in software.

7. The computing system of claim 1, wherein the data is sampled at a sampling rate of a central processing unit (CPU) corresponding to the virtual processor.

8. The computing system of claim 1, wherein the embedded processor further comprises one or more processing cores on a system-on-chip (SoC).

9. A computer-implemented method comprising:
implementing a virtual processor in field programmable gate array (FPGA) programmable logic, the virtual processor comprising a virtual version of a target system;
capturing data representative of operations in the virtual processor using a bus access device configured to provide direct access to components of the virtual processor;
streaming the data to an embedded processor via a virtual processor interface, the embedded processor coupled to the FPGA programmable logic via the virtual processor interface, the embedded processor being distinct from the FPGA programmable logic;
storing the data in the memory device; and
performing, substantially in real time while the target system is running, in-situ disassembly and debugging of the data representative of the operations of the virtual processor, wherein the debugging comprises one or more of a tracing operation, a breakpoint operation, a watchpoint operation, a triggering operation, a halting operation, or an event counting operation.

10. The computer-implemented method of claim 9, wherein the memory device is a random-access memory (RAM)-based first-in-first-out (FIFO) memory.

11. The computer-implemented method of claim 9, wherein the data is streamed to the embedded processor using a using a direct memory access (DMA) channel.

12. The computer-implemented method of claim 9, wherein the virtual processor implemented in FPGA logic is instead implemented in Application Specific Integrated Circuit (ASIC) logic.

13. The computer-implemented method of claim 9, wherein the memory device is double data rate (DDR) memory and the data stored in the memory device is written into the memory device via a DMA transfer.

14. The computer-implemented method of claim 9, wherein the hardware and operations of the target system are emulated in software.

15. The computer-implemented method of claim 9, wherein the data is sampled at a sampling rate of a central processing unit (CPU) corresponding to the virtual processor.

16. The computer-implemented method of claim 9, wherein the embedded processor further comprises one or more processing cores on a system-on-chip (SoC).

17. A non-transitory computer readable medium having stored therein instructions that when executed cause a computer to perform a method comprising:
implementing a virtual processor in field programmable gate array (FPGA) programmable logic, the virtual processor comprising a virtual version of a target system;
capturing data representative of operations in the virtual processor using a bus access device configured to provide direct access to components of the virtual processor;
streaming the data to the embedded processor;
storing the data in the memory device; and
performing, substantially in real time while the target system is running, in-situ disassembly and debugging of the data representative of the operations of the virtual processor, wherein the debugging comprises one or more of a tracing operation, a breakpoint operation, a watchpoint operation, a triggering operation, a halting operation, or an event counting operation.

* * * * *